US009444801B2

(12) United States Patent
Luo et al.

(10) Patent No.: US 9,444,801 B2
(45) Date of Patent: Sep. 13, 2016

(54) METHOD, DEVICE AND SYSTEM FOR VERIFYING COMMUNICATION SESSIONS

(75) Inventors: Yutang Luo, Shanghai (CN); Yaoxian Zhang, Shanghai (CN); Margi Rinaldo, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 92 days.

(21) Appl. No.: 13/882,042

(22) PCT Filed: Oct. 13, 2011

(86) PCT No.: PCT/IB2011/002833
§ 371 (c)(1),
(2), (4) Date: Apr. 26, 2013

(87) PCT Pub. No.: WO2012/069919
PCT Pub. Date: May 31, 2012

(65) Prior Publication Data
US 2013/0232560 A1 Sep. 5, 2013

(30) Foreign Application Priority Data

Nov. 24, 2010 (CN) .......................... 2010 1 0574809

(51) Int. Cl.
*H04L 29/06* (2006.01)
*H04L 9/32* (2006.01)
*H04L 29/08* (2006.01)

(52) U.S. Cl.
CPC ............. *H04L 63/08* (2013.01); *H04L 9/3215* (2013.01); *H04L 63/083* (2013.01); *H04L 63/18* (2013.01); *H04L 67/14* (2013.01); *H04L 2209/805* (2013.01)

(58) Field of Classification Search
None
See application file for complete search history.

(56) References Cited

U.S. PATENT DOCUMENTS

| 6,529,880 B1 * | 3/2003 | McKeen | ................ G06Q 20/02 705/17 |
| 7,756,748 B2 * | 7/2010 | Shaked | ................... G06F 21/31 705/26.1 |

(Continued)

FOREIGN PATENT DOCUMENTS

| CN | 1684411 | 10/2005 |
| CN | 101795196 | 8/2010 |

(Continued)

OTHER PUBLICATIONS

G. Zhang, F. Cheng, C. Meinel; "SIMPA: A SIP-based Mobile Payment Architecture"; Seventh IEEE/ACIS International Conference on Computer and Information Science; Copyright 2008 IEEE.*

*Primary Examiner* — Andrew Nalven
*Assistant Examiner* — Christopher Ruprecht
(74) *Attorney, Agent, or Firm* — Patti & Malvone Law Group, LLC

(57) ABSTRACT

An example technique is provided for authenticating a first communication session. The technique includes receiving an indication that a first network device has established a first communication session with a user-side device. A second network device authenticates the first communication session by establishing a second communication session via session initiation protocol (SIP) or voice over Internet protocol (VoIP) communication with the user-side device before the user-side device directs a user password to the first network device in the first communication session. Also, private identification information of the user is retrieved from a database and sent to the user-side device in the second communication session. The user-side device compares the private identification information received in the second communication session to locally stored private identification information to determine whether the received private identification information matches.

21 Claims, 5 Drawing Sheets

(56) References Cited

U.S. PATENT DOCUMENTS

| | | | | |
|---|---|---|---|---|
| 2002/0174068 A1* | 11/2002 | Marsot | | 705/39 |
| 2004/0030601 A1* | 2/2004 | Pond | | B67D 7/145 |
| | | | | 705/16 |
| 2008/0127319 A1* | 5/2008 | Galloway et al. | | 726/9 |
| 2009/0132415 A1* | 5/2009 | Davis | | G06Q 20/10 |
| | | | | 705/43 |
| 2009/0279682 A1* | 11/2009 | Strandell | | H04L 63/18 |
| | | | | 379/201.02 |
| 2010/0070636 A1* | 3/2010 | Skog | | H04L 12/2818 |
| | | | | 709/228 |
| 2010/0205309 A1* | 8/2010 | Skog | | H04L 12/2818 |
| | | | | 709/227 |
| 2011/0086616 A1* | 4/2011 | Brand et al. | | 455/411 |
| 2011/0191210 A1* | 8/2011 | Blackhurst et al. | | 705/27.1 |
| 2012/0109762 A1* | 5/2012 | Getchius | | G06Q 20/20 |
| | | | | 705/17 |
| 2012/0192261 A1* | 7/2012 | Blot-Levevre | | G06Q 20/02 |
| | | | | 726/10 |
| 2012/0265889 A1* | 10/2012 | Skog | | H04L 12/2818 |
| | | | | 709/228 |

FOREIGN PATENT DOCUMENTS

| | | | | |
|---|---|---|---|---|
| WO | 2010014386 | 2/2010 | | |
| WO | WO 2010123385 A1 * | 10/2010 | | H04L 61/015 |

* cited by examiner

METHOD, DEVICE AND SYSTEM FOR VERIFYING COMMUNICATION SESSIONS

TECHNICAL FIELD

The invention relates to communications, and in particular, relates to network communications.

BACKGROUND

With the gradual popularization of network communications, network security becomes a big concern for people. Currently, in most of network operations conducted by users, an authentication in a certain form will be carried out between each other (i.e. a user and service provider of a network side) to guarantee the communication security of both parties. For example, a user, when access to a specific network or login a mailbox, usually need to enter his username and password and is allowed to access only if he is verified. Generally, a higher security is required when a user is making payments online, then certainly usernames and passwords are required to be input, and even additional measures in other forms such as proofs such as secret keys, certificate, or the like, are also required to guarantee security of communications.

Nevertheless, although various more and more complicated encrypted algorithms and data transmission methods are proposed to protect communication security, users' private information still easily got stolen. For instance, in the existing solutions, users always entered their private information (such as passwords, ect.) in some network connections which they believed reliable, but the private information is always stolen by a malicious third party. Thus, how to identify the reliability of communication sessions is still a concern for technicians.

SUMMARY

The invention provides a method, device and system for verifying a communication session, for authenticating the reliability of a communication session, thereby at least alleviate the above problem in prior art.

According to an aspect of the invention, a method for verifying a communication session is proposed, comprising: establishing another session with a user-side device at a network device or at another network device associated with said network device before providing proprietary information of a user in a communication session established between the user-side device and the network device; and sending private identification information of the user to the user-side device in the another session;
wherein, said verification can be based on a determination of the user on the consistence between the received private identification information and private identification information previously set by the user.

With the above solution, said verification can be used to determine whether to provide said proprietary information of the user.

Optionally, said method also comprises receiving user recognition information from the user-side device to recognize the identity of the user, if the private identification information received by the user is consistent with the private identification information previously set by the user.

Optionally, said user-side device is at least one of portable terminal, fixed terminal, mobile terminal or combinations thereof. Preferably, the device is mobile phone, station, unit, device, multimedia computer, multimedia board, internet node, communicator, desktop computer, laptop computer, personal digital assistant (PDA), etc. Preferably, the portable mobile device has a RF communication capability.

Optionally, said network device is a service managing device, and another network device associated with it is a service center.

Preferably, said another session is a SIP or VoIP session.

Preferably, said communication session to be verified is used for charging. Said proprietary information and said user recognition information are user password.

Wherein, the communication session is established between said user-side device and service managing device in the network. Preferably, the user-side device is connected to the service managing device via a card reader through RF communication. The another session is established between the user-side device and service centre in the network.

According to another aspect of the invention, a method for verifying a communication session is provided, comprising: establishing at the side of a user device another session with a network device or with another network device associated with the network device before providing proprietary information of a user in a communication session established between the user-side device and the network device;
receiving in said another session user private identification information from the network device or from another network device associated with said network device; and
performing said verification by determining the consistence between the received private identification information and private identification information previously set by the user.

Optionally, the method also comprises sending user recognition information to the opposite party in said another session such that the opposite party can recognize the identity of the user, if the private identification information received by the user is consistent with the private identification information previously set by the user.

According to another aspect of the invention, a device for verifying a communication session is provided, comprising: information transceiving means for transceiving information;
session managing means for establishing another session with a user-side device via the information transceiving means before providing proprietary information of a user in a session established between the user-side device and the network device; and
private identification information maintenance means for providing private identification information of the user to the user-side device via the information transceiving means in said another session;
wherein, said verification can be based on a determination of the user on the consistence between the received private identification information and private identification information previously set by the user.

Preferably, the information transceiving means receives user recognition information from the user-side device to recognize the identity of the user if the private identification information received by the user is consistent with the private identification information previously set by the user.

According to another aspect of the invention, a device for verifying a communication session is provided, comprising: information transceiving means for transceiving information;
session managing means for establishing another session with a network device or with another network device associated with the network device via the information transceiving means before providing proprietary information of a user in a session established between the user-side device and the network device; and determining means for performing said verification by determining the consistence between the private identification information received in the another session via the information transceiving means and private identification information previously set by the user; wherein said private identification information of the user is from said network device or from another network device associated with said network device.

Wherein, said device further comprises a RF module for establishing said session.

According to another aspect of the invention, a system for verifying a communication session is provided, comprising: service managing device for establishing the communication session with a user-side device;
a service centre for establishing another session with said user-side device before the user providing proprietary information in the communication session, and sending private identification information of the user to the user-side device in the another session;
wherein, said verification can be based on a determination of the user on the consistence between the received private identification information and private identification information previously set by the user.

According to the solution of the invention, the private identification information already set by the user is transmitted through another new session, and the reliability of an established session is determined according to whether the private identification information received in the new session is consistent with the private identification information previously set. The user provides his proprietary information in the established session only if the session is reliable, otherwise, he may terminate the established communication session. In other words, the communication security of the user is better protected by establishing another session to verify the reliability of the current session.

After researching the following detailed description combined with figures, the other methods, characteristics and advantages of this invention will be or will become obvious for a person skilled in the art. All these other methods, characteristics and advantages are intended to be included in this specification, covered by the scope of this invention, and protected by the claims attached thereto.

DETAILED DESCRIPTION

Figure 1:
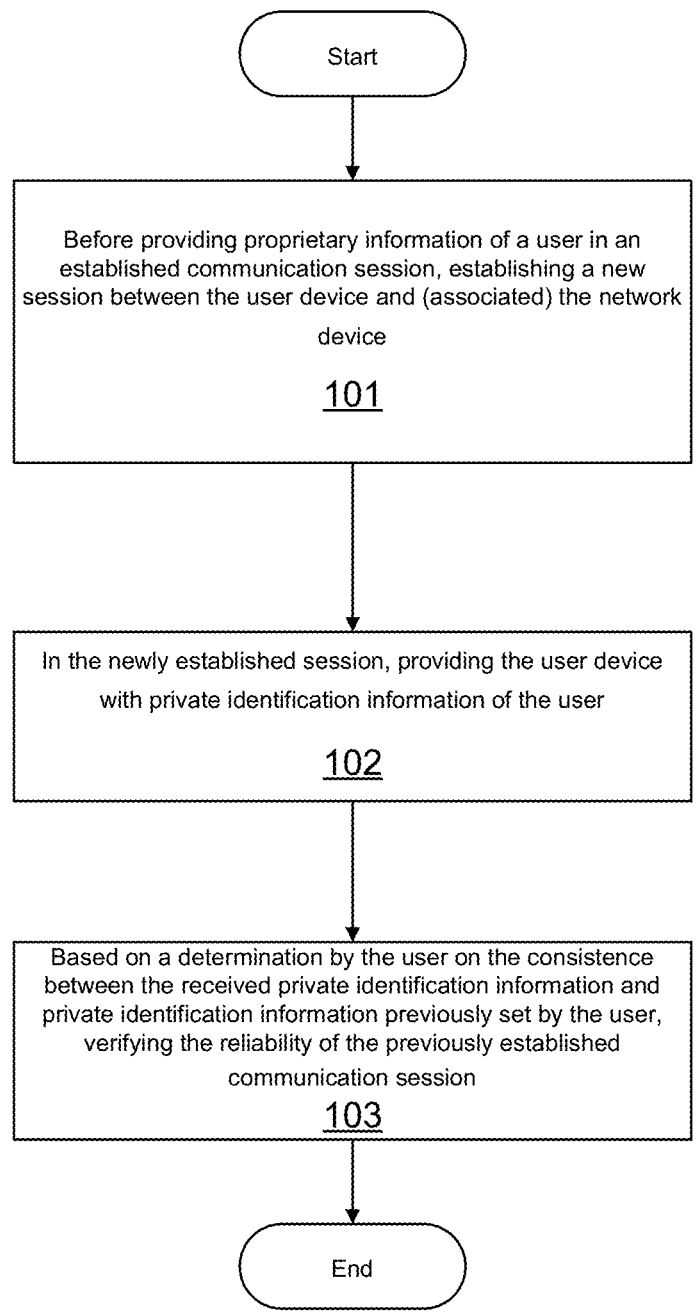
FIG. 1 illustrates a method for verifying a communication session according to the invention.

FIG. 1 illustrates a method for verifying a communication session according to the invention. Wherein, the method is performed before the communication session to be verified has already been established and the user provides his proprietary information through the session. The method may be initiated proactively by the user device, and may also be initiated by the network device which has established the communication session to be verified with the user. At step 101, a new session is established between the user device and network device. At step 102, in this newly established session, private identification information of the user is provided to the user device. At step 103, whether the to-be-verified session previously established is reliable or not (whether the network device that has established a session connection with the user device is reliable or not) is determined by determining whether the received information is consistent with the information previously set by the user. As shown in FIG. 1, a new session may be established between the user and the same network device. Preferably, the new session is established between the user and another network device, wherein, such another network device is associated with the network device which previously established the to-be-verified communication session with the user. In the method, the private identification information set by the user may be maintained by a device that has established a new communication session with the user device, such as the network device hereinabove, or may be maintained by other devices or specialized database, and is acquired by the network device that has established the new communication session, if required.

Moreover, the method may also comprise: subsequently, in the case that the private identification information received by the user is consistent with the private identification information previously set by the user, sending user recognition information (such as password, etc.) by the newly established session so that the opposite party of the session can recognize the identity of the user. In this case, a bi-directional verification between the user and network device is conducted in the newly established session. Concretely, the user verifies whether the opposite party of the session is reliable or not by determining the received private identification information; the opposite party of the session, namely, the network device, determines whether the user is an authorized user according to the received user recognition information. If any one of the bi-directional verification fails, the newly established session will be terminated, and accordingly, the to-be-verified communication session will be terminated for being deemed as unreliable, too.

Figure 2:
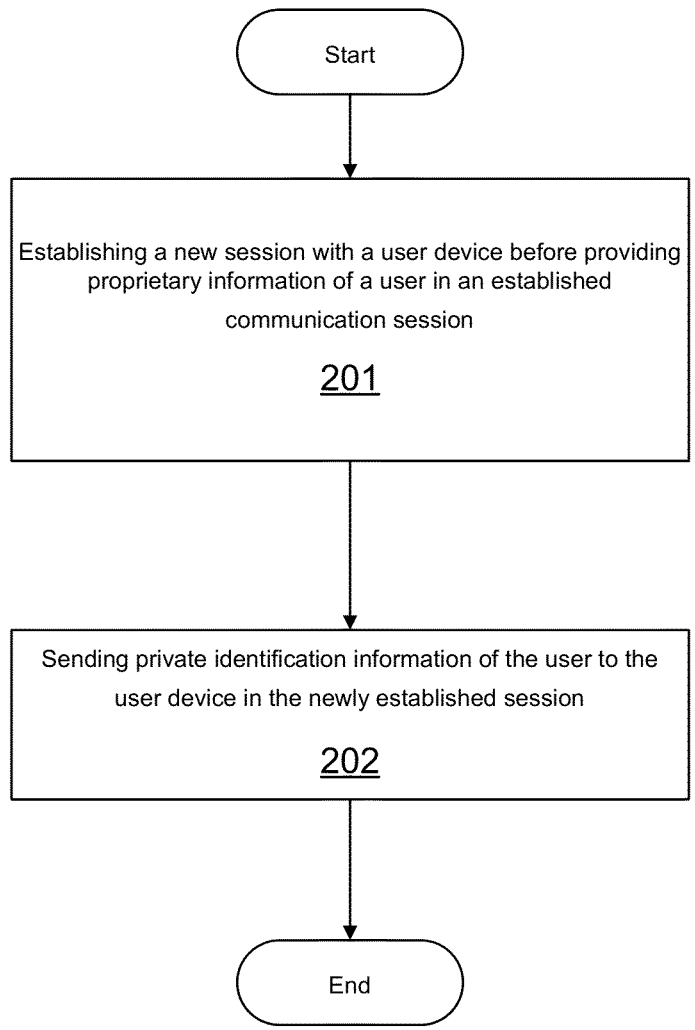
FIG. 2 illustrates a method for performing a verification of a communication session at a network device according to the invention.
Figure 3:
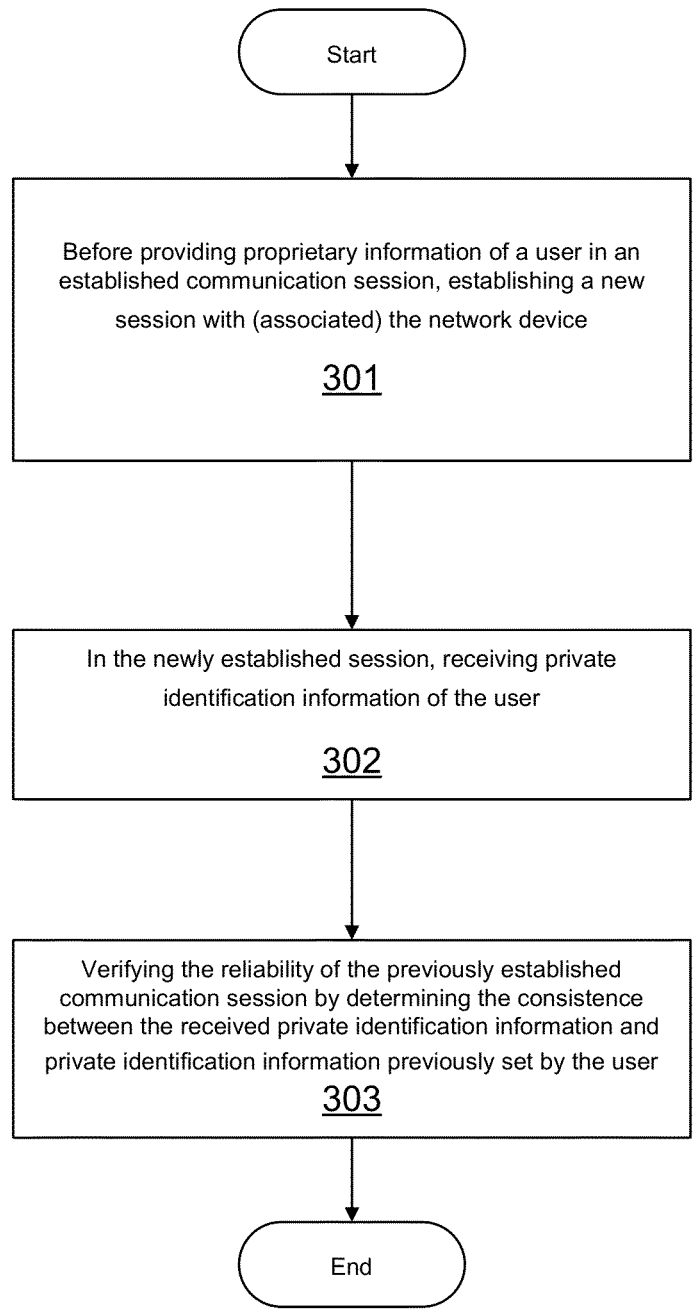
FIG. 3 illustrates a method for performing a verification of a communication session at a user device according to the invention.

FIGS. 2 and 3 illustrates a method for performing a verification of a communication session at a network device and at a user device according to the invention respectively. Wherein, the method indicated in FIG. 2 is implemented on the network device that has established a to-be-verified communication session with the user, or on a network device associated with this network device. It can be seen from FIG. 2 that, the steps 201 and 202 therein correspond to the corresponding steps in FIG. 1. According to the invention, as long as the user is provided with his private identification information at the network device through a newly established session, the verification of the established session can be performed on the basis of the offered private identification information. FIG. 3 explains the method of the invention from the user device's view. Given that FIGS. 2 and 3 are based on the same concept with FIG. 1, details are omitted here.

As can be seen from above, the principle of the invention is verifying the reliability/legality of the participating parties of an established session by establishing a new session. Since the solution of the invention is performed before the user provides his proprietary information in the to-beverified communication session, the user can get an effective protection and his information can be avoided from being acquired by any illegal third party. If the to-be-verified communication session is determined as reliable according to the solution of the invention, the initially planned operation in the to-be-verified communication session can continue, e.g. the user enters sensitive information such as password, personal identify, etc.; otherwise the session will be terminated directly. Thus, the invention has a good compatibility, because the application of the invention at most introduced a certain waiting time at a specific location, without requirement for an amendment on the existing communication rules/operation process. The session environment where the invention may be applied is, for instance, during a user's operation of network access or payment, he performs this invention before the entry of password. A person skilled in the art is easy to understand that, the introduction of waiting time into the to-be-verified communication session will not bring any technical puzzle to the application of the invention, as it can be realized by utilizing the prior art that are already known.

Furthermore, in the newly established session, there are various appropriate manners that can be adopted to provide the private identification information of the user, which depends on the protocol specifications followed by the established session. For example, the session could be all kinds of applicable sessions such as SIP session, VoIP session, etc., protocols followed by communication sessions can be various protocols including the existing protocols, such as 2G and 3G or the like, as well as future protocols under planning. Accordingly, the user's private identification information mentioned in the text could be in any proper forms, such as text, video, audio, or the like.

Figure 4:
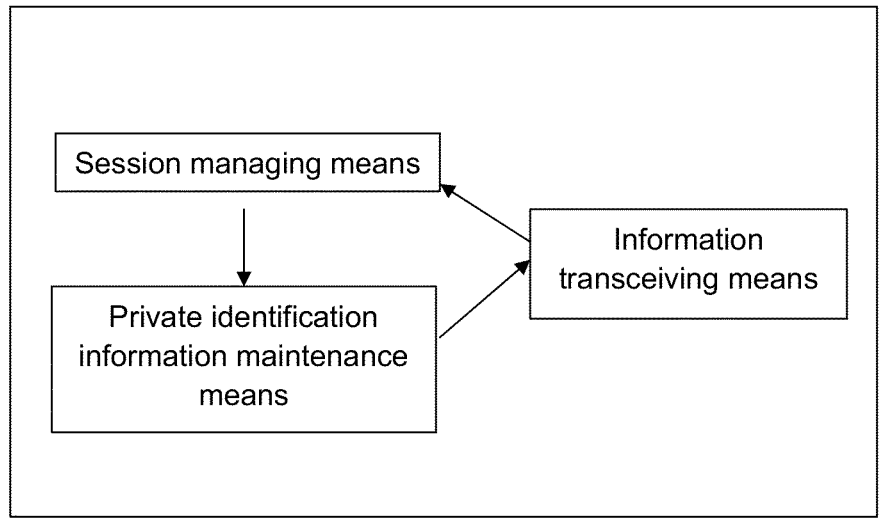
FIG. 4 illustrates a schematic block diagram of a network device according to the invention.

FIG. 4 illustrates a schematic block diagram of a network device according to the invention. As shown in FIG. 4, the device comprises: information transceiving means, used for transmitting and receiving information; session managing means, used for, before providing proprietary information of a user in a session established between a user-side device and network device, establishing another session with said user-side device via said information transceiving means; and private identification information maintenance means, used for, in said another session, providing private identification information of the user to said user-side device via said information transceiving means. The various preferable, optional or alternative solutions aforementioned can all be implemented on such device. For instance, in the case that the private identification information received by the user is consistent with the private identification information previously set by the user, the information transceiving means receives user recognition information from the user-side device to recognize the identity of the user.

In addition, as stated above, the device could be the device which previously established a to-be-verified communication session with the user, and can also be other independent devices associated therewith, such as the service managing device and service centre to be mentioned in the following. Alternatively, the device could be a device distributed in the network as well, for example, said private identification information maintenance means is a single database, or deployed on an appropriate database device.

Figure 5:
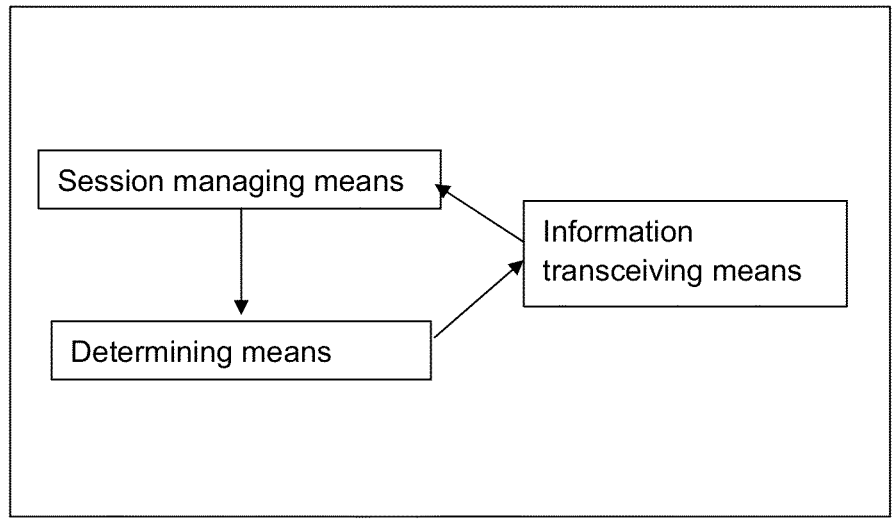
FIG. 5 illustrates a schematic block diagram of a user device according to the invention.

FIG. 5 illustrates a schematic block diagram of user device according to the invention. As shown in FIG. 5, the device comprises: information transceiving means, used for transmitting and receiving information; session managing means, used for, before providing proprietary information of a user in a session established between a user-side device and network device, establishing another session with said network device or with another network device associated with said network device via said information transceiving means; and determining means, used for performing said verification by determining the consistence between the private identification information received in said another session via said information transceiving means and private identification information previously set by the user. Wherein the private identification information previously set by the user is maintained by the user device, and the determining means can compare it with the received identification information to get a conclusion about their consistence. Optionally, the determining means may also, by presenting the received private identification information to the user in a proper form (such as text, video, audio or the like) according to its characteristics, thereby conduct the above determination of consistence through the feedback of the user.

As mentioned hereinabove, the user's private identification information is from said network device or another network device associated with said network device. Similarly, all the preferable, optional or alternative solutions aforementioned can be implemented on the device by corresponding means. For instance, in the case that the private identification information received by the user is consistent with the private identification information previously set by the user, the information transceiving means may send user recognition information, thereby a bi-directional verification between the communicating parties is conducted in the newly established session.

It should be noted that, the device could be any type of mobile terminal, fixed terminal or portable terminal, including mobile phone, station, unit, device, multimedia computer, multimedia board, internet node, communicator, desktop computer, laptop computer, PDA, or any combinations thereof. Preferably, the portable device has a RF module capable of RF communication. In this situation, the RF communication could be, for example, user's access to a network, information browse, network payment, etc. For instance, in an application example to be described in detail in the following text, the user can communicate with a card reader through a mobile phone equipped with RF function, and further establish a communication connection with the network device providing corresponding service, i.e. establishing the to-be-verified communication session indicated above.

Figure 6:
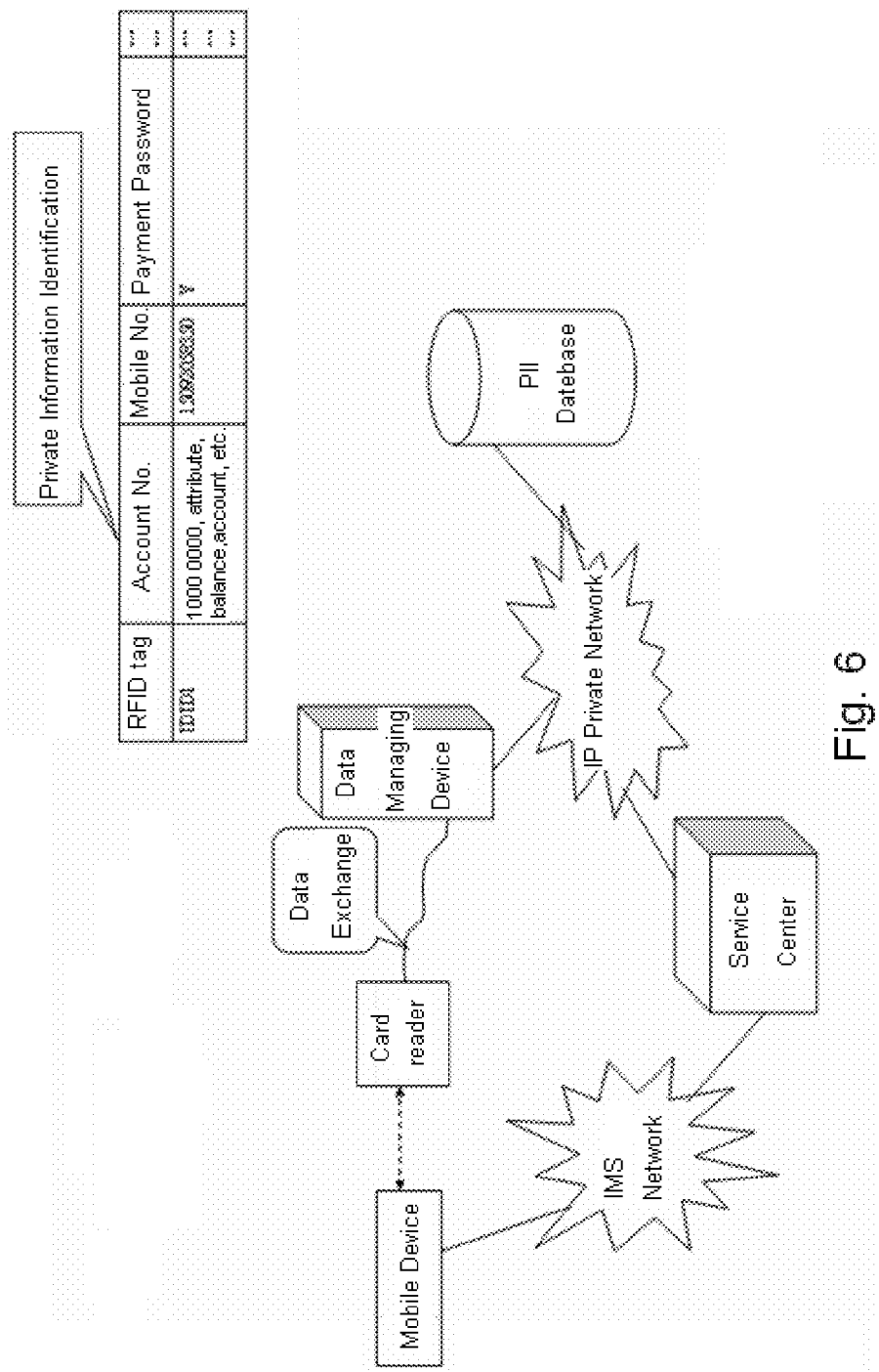
FIG. 6 illustrates a network framework in which the invention is applicable.

FIG. 6 illustrates a network framework capable of applying the invention. As shown in FIG. 6, a user side comprises a mobile device and a card reader, while the network comprises a service centre, a private identification information database and a service managing device maintained by a service provider (such as a network operator, a service provider like bank or the like). Wherein, the mobile device has a RF function, and communicates with the card reader to accomplish user operations such as payment. Such mobile device is familiar to those skilled in the art, such as a RFID-SIM card phone formed by combining SIM card and RFID functions, or a mobile phone equipped with independent SIM card and RFID functional module, such phones store relevant information of the user (such as the RIFD tag information shown in FIG. 6) to provide a payment function. A person skilled in the art can understand that, how to use a phone to make a payment through RF or other networks is a prior art, e.g. binding the user's SIM card with one or more of a specific bank, network operator or service provider. In particular, first, information is transmitted between the mobile device and card reader through RF communication, so that the card reader can read related data, for instance, reading the RFID tag information of the format illustrated in FIG. 6, including the mobile device's ID, account number, mobile device number, whether the password is required to be entered in payment, etc. Subsequently, the card reader establishes a connection with the service managing device of the corresponding service provider in the network, which is the managing device of an operator or bank in this embodiment, so as to send the information obtained from the mobile device and amount to be paid. In the prior art, the next step is that the service managing device starts to verify the mobile device, e.g. offering a window for the user to enter his password, and if the verification is passed, the payment operation is accomplished.

As for the solution of the invention, the solution of the invention may be applied before the user provides his proprietary information like the user password stated above. In this embodiment, the user may set and save his private identification information in the private identification information database in FIG. 6, for verifying the currently established session in the newly established session mentioned hereinabove. After the service managing device receives a message from the card reader, i.e. after the communication session is established, and before the mobile device provides its proprietary information for the service managing device, in this embodiment, a service center associated with the service managing device initiates a connection with the mobile device. In order to provider the user of the mobile device with more recognizable information, here, we preferably assume that the service centre has a fixed calling party number assigned by the service provider, e.g. 16309558000. This facilitates user to identify whether the received call is an official call from the service provider. Here, we take the call which follows SIP protocol as an example for explanation. Wherein, SIP invite message is as follows:

```
[INVITE sip:+16309558000@ssp624.bank.com;ext=1234 SIP/2.0
/*top line of the message, prescribing information such as destination,
changeable proxy, and the like*/
Max-Forwards: 70
Contact: <sip: 135.2.52.207:5061>  /*containing SIP URI used
for establishing sessions*/
Route: <sip: pcsf-stdn.s1c04.ssp624.bank.com:5060;lr;bidx=0>
Call-ID: 1@135.2.52.207-5061
CSeq: 1 INVITE
P-Asserted-Identity: <sip: + 16309558000@ssp624.bank.com>
P-Preferred-Identity: <sip: + 16309558000 @ssp624.bank.com>
To: RFID payment user /*the logically receipt of a request*/
<sip:+16309792002@ssp624.bank.com;ext=1234>
From: Bank <sip: + 16309558000 @ssp624.bank.com>; tag=116771
Via: SIP/2.0/UDP 135.2.52.207:5061; branch=z9hG4bK90302
Supported: 100rel, timer
Session-Expires: 600
Content-Length: 112
v=0
o=- 203596476 63691494 IN IP4 135.2.52.207
s=-
c=IN IP4 135.2.52.207
t=0 0
m=audio 5006 RTP/AVP 8 3 0
]
```

In the above exemplary SIP INVITE message, the texts between the identifier "/**/" are not contained in the INVITE message but are commentary words added for explaining the purpose of the invention. In fact, those skilled in the art have already known the format and content of the SIP INVITE message, so instructions are omitted here.

After having established a connection with the user's mobile device, the service centre retrieves through the service managing device the private identification information corresponding to this user maintained in the PII (private identification information) database, e.g. specific identification information of this user device/user received from the card reader. More specifically, the private identification information may include RFID tag information including a mobile device ID, an account number, a mobile number and whether a user payment password is required to be entered in order to complete payment. Then, the service center sends the acquired private identification information to the mobile device. Upon receiving the information, the mobile device conducts a determination of the consistence of the private identification information in the way stated above. Concretely, if the received private identification information and information previously set by the user are identical, the current connection established with service managing device in the network by the card reader can be determined as reliable, and further the operation in the session can be continued, for example, the verification between the service managing device and mobile device is conducted, and the user enters corresponding proprietary information like password to complete the payment. Otherwise, the user may terminate the currently established session.

Optionally, in order to enhance the security of information transmission, if necessary, all kinds of high level security encryption technologies which are currently well-known, under development or emerging in future may be adopted in the information transmissions between the card reader and service managing device, or between the mobile device and service centre, such as DES (Data Encryption Standard), static encryption algorithm, or the like.

As can be known from the above text that, FIG. 6 gives a specific example to which the invention can be applied. Obviously, a person skilled in the art can make any variant, alteration or change that is feasible or suitable for concrete network requirements. For example, as a substitute, the newly established session may not be established between the service centre and mobile device, but between the service managing device and mobile device. Another example is that, before initiating a connection with the user device, the service centre retrieves the private identification information corresponding to the user from the database first. Another example is that, after establishing a connection with the service managing device at the network side via the card reader, the mobile device proactively initiates, by related information maintained by it, a request for establishing a connection to the network-side device, such as the service managing device, service centre, or the like. In one word, the solution of the invention is not limited to specific orders and forms described in FIG. 6 including specific information format, operation flows or the like, and will fall in the scope sufficiently disclosed by the invention as long as it has the same or equivalent content with the above examples without departing from the spirit of the invention.

According to the above text, a person skilled in the art is easy to understand that, the invention could be implemented by hardware, firmware, software or combinations of various forms or various feasible manners. And depending on specific network application environment, requirements and protocol norms, adaptive processing such as amendment, combination, split and deletion may be conducted within the scope of the method and device structure of the invention without departing from the scope of the invention.

The invention claimed is:

1. A method, comprising:
receiving an electronic indication that a first network device has established a first communication session with a user-side device, wherein said user-side device is connected to said first network device via a card reader through RF communication; and
authenticating, by a second network device, said first communication session by establishing a second communication session via session initiation protocol (SIP) or voice over internet protocol (VoIP) communication with said user-side device before said user-side device directs a password of a user to said first network device in said first communication session, wherein said second communication session comprises:
retrieving, from a database, private identification information of the user that comprises RFID tap information that includes a mobile device ID; and
directing, to said user-side device, said private identification information for comparison to locally stored private identification information prior to said user-side device directing said password to said first network device in said first communication session on the condition that said directed private identification information matches said locally stored private identification information.

2. The method according to claim 1, wherein said private identification information is selected from the group consisting of text, audio, and video.

3. The method according to claim 1, wherein said private identification information comprises audio or video data.

4. The method according to claim 1, wherein said first communication session is used for charging or payment.

5. The method according to claim 1, wherein said private identification information further comprises at least one of RFID tag information that includes the mobile device ID, an account number, a mobile number and a condition indicating whether a user payment password is required to be entered in order to complete the payment.

6. The method according to claim 1, wherein said second communication session is initiated on an IMS network.

7. A device, comprising:
a transceiver configured to receive an indication that a first network device has established a first communication session with a user-side device, wherein said user-side device is connected to said first network device via a card reader through RF communication;
a session manager configured to establish, via session initiation protocol (SIP) or voice over internet protocol (VoIP) communication, a second communication session with said user-side device via said transceiver to authenticate said first communication session before said user-side device directs a password of a user to said first network device in said first communication session; and
a private identification information manager configured to:
retrieve, from a database, private identification information of the user that comprises RFID tag information that includes a mobile device ID; and
direct said private identification information of the user in said second communication session to said user-side device via said transceiver for comparison to locally stored private identification information prior to said user-side device directing said password to said first network device in said first communication session on the condition that said directed private identification information matches said locally stored private identification information.

8. The device according to claim 7, wherein said private identification information is selected from the group consisting of text, audio, and video.

9. The device according to claim 7, wherein said private identification information comprises audio or video data.

10. The device according to claim 7, wherein said device is located in said first network device or in another network device associated with said first network device, or distributed in the two devices.

11. The device according to claim 7, wherein said first network device comprises a service managing device.

12. The device according to claim 10, wherein said another network device associated with said first network device is a service center.

13. The device according to claim 7, wherein said first communication session to be authenticated is used for charging or payment.

14. The device according to claim 7, wherein said private identification information further comprises at least one of RFID tag information that includes the mobile device ID, an account number, a mobile number and a condition indicating whether a user payment password is required to be entered in order to complete the payment.

15. An apparatus, comprising:
a transceiver configured to establish a first communication session with a first network device, wherein said apparatus is connected to said first network device via a card reader through RF communication;
a session manager configured to establish a second communication session with a second network device via session initiation protocol (SIP) or voice over internet protocol (VoIP) communication via said transceiver to authenticate said first communication session before said apparatus directs a password of a user to said first network device in said first communication session; and
a computing device configured to:
receive, in said second communication session, private identification information of the user retrieved from a database by said second network device, wherein said private identification information comprises RFID tag information that includes a mobile device ID;
compare the received private identification information to locally stored private identification information; and
direct to said first network device in said first communication session the password of the user on the condition that the received private identification information is identical to said locally stored private identification information.

16. The apparatus according to claim 15, wherein said private identification information is selected from the group consisting of text, audio, and video.

17. The apparatus according to claim 15, wherein said private identification information comprises audio or video data.

18. The apparatus according to claim 15, wherein said apparatus comprises a mobile phone.

19. The apparatus according to claim 15, wherein said private identification information further comprises at least one of RFID tag information that includes the mobile device ID, an account number, a mobile number and a condition indicating whether a user payment password is required to be entered in order to complete the payment.

20. A system, comprising:
a service managing device configured to establish a first communication session with a user-side device, wherein said user-side device is connected to said service managing device via a card reader through RF communication; and a service center configured to authenticate said first communication session by establishing a second communication session via session initiation protocol (SIP) or voice over internet protocol (VoIP) communication to connect with said user-side device before said user-side device directs a password of a user to said service managing device in said first communication session, wherein, during said second communication session, said service center is configured to:

retrieve, from a database, private identification information of the user that comprises RFID tag information that includes a mobile device ID; and direct, to said user-side device, said private identification information;

wherein said user-side device is configured to:

compare said private identification information received in said second communication session to locally stored private identification information; and direct said password of the user to said service managing device in said first communication session on the condition that said received private identification information matches said locally stored private identification information.

21. The system according to claim 20, wherein said service center accesses the database via an IP private network.

* * * * *